United States Patent
Libner

(10) Patent No.: US 9,296,284 B2
(45) Date of Patent: Mar. 29, 2016

(54) SHELTER STRUCTURE, IN PARTICULAR FOR A LOAD DECK, SUCH AS A PLATFORM OF A TRUCK, A TRAILER, OR THE LIKE, AND A SHELTER INCORPORATING SUCH A STRUCTURE

(71) Applicant: S.A. LIBNER, St-Maixent-l'Ecole (FR)

(72) Inventor: Herve Libner, Saint Maixent l'Ecole (FR)

(73) Assignee: S.A. LIBNER, St-Maixent-l'Ecole (FR)

( * ) Notice: Subject to any disclaimer, the term of this patent is extended or adjusted under 35 U.S.C. 154(b) by 10 days.

(21) Appl. No.: 14/220,226

(22) Filed: Mar. 20, 2014

(65) Prior Publication Data

US 2015/0231952 A1 Aug. 20, 2015

(30) Foreign Application Priority Data

Feb. 19, 2014 (FR) ...................................... 14 51332

(51) Int. Cl.
*B60J 7/06* (2006.01)
*B60J 7/02* (2006.01)

(52) U.S. Cl.
CPC ..... *B60J 7/06* (2013.01); *B60J 7/02* (2013.01)

(58) Field of Classification Search
CPC .............. B60J 7/06; B60J 7/065; B60J 7/064; B60J 7/062; B60J 7/061
USPC .................. 296/105, 100.12, 100.11, 100.13, 296/100.16, 100.17; 105/377.02, 377.03, 105/377.09, 377.1; 135/128, 129, 130, 133, 135/134, 151, 143, 148, 149, 907
See application file for complete search history.

(56) References Cited

U.S. PATENT DOCUMENTS

| | | | | |
|---|---|---|---|---|
| 3,064,667 | A * | 11/1962 | Marino | 135/131 |
| 3,140,116 | A * | 7/1964 | Speas | 296/26.05 |
| 4,305,415 | A * | 12/1981 | Galli | 135/140 |
| 4,392,682 | A * | 7/1983 | Norkus, Jr. | 296/26.05 |
| 5,005,896 | A * | 4/1991 | Li | 296/100.18 |
| 5,167,246 | A * | 12/1992 | Mortenson | 135/153 |
| 5,524,953 | A * | 6/1996 | Shaer | 296/100.12 |
| 5,839,462 | A * | 11/1998 | Randall | 135/128 |
| 6,616,211 | B2 * | 9/2003 | Cramaro | 296/100.15 |
| 6,976,433 | B1 * | 12/2005 | Neumann | 105/377.03 |
| 8,491,030 | B2 * | 7/2013 | Stroup et al. | 296/100.01 |
| 2002/0167193 | A1 * | 11/2002 | Fliege et al. | 296/105 |
| 2007/0085369 | A1 * | 4/2007 | Henning et al. | 296/100.12 |

(Continued)

FOREIGN PATENT DOCUMENTS

FR 2 891 782 4/2007

*Primary Examiner* — H Gutman
(74) *Attorney, Agent, or Firm* — Sofer & Haroun, LLP

(57) ABSTRACT

A shelter structure for a load deck includes:
  parallel arches each formed by facing uprights connected together by a cross-member and movable along a guide path between a deployed position of the structure, forming a shelter for the deck, and a more compact folded position releasing at least a portion of the deck;
  connection elements between the facing uprights of two adjacent arches; and
  a plurality of spreaders, each connected to an arch by a hinged connection so as to pass from a folded position in which it presses against the arch to a deployed position in which it forms an additional cross-member, and vice versa. The hinge connection, for at least one spreader, is a pivotal connection of the spreader to the arch about an axis substantially parallel to the longitudinal axis of the cross-member, and a sliding connection of the spreader along an upright of the arch.

13 Claims, 8 Drawing Sheets

(56) References Cited

U.S. PATENT DOCUMENTS

| | | | |
|---|---|---|---|
| 2010/0289291 A1* | 11/2010 | Ting | 296/100.17 |
| 2011/0187148 A1* | 8/2011 | Damsi | 296/100.15 |
| 2013/0249237 A1* | 9/2013 | Damsi et al. | 296/100.12 |
| 2013/0302105 A1* | 11/2013 | Stroup et al. | 410/132 |

* cited by examiner

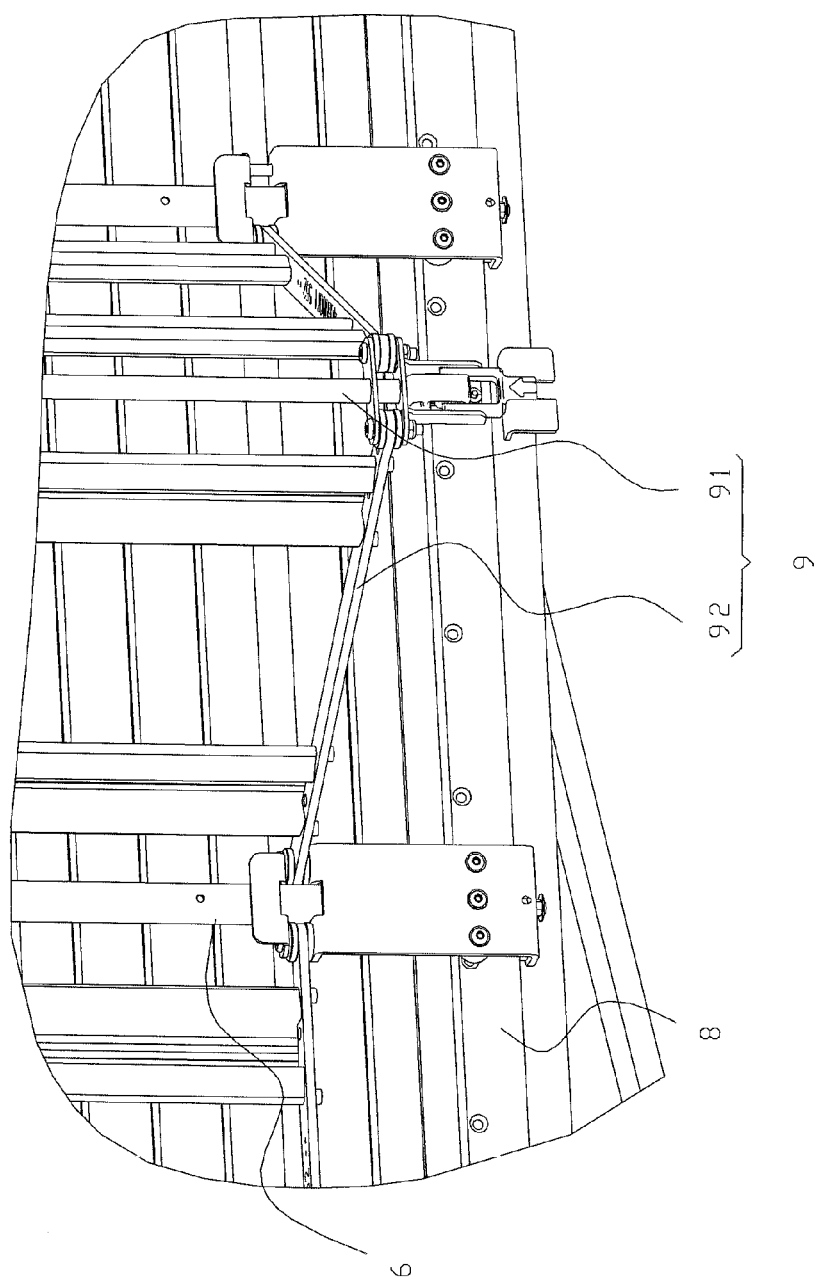

SHELTER STRUCTURE, IN PARTICULAR FOR A LOAD DECK, SUCH AS A PLATFORM OF A TRUCK, A TRAILER, OR THE LIKE, AND A SHELTER INCORPORATING SUCH A STRUCTURE

FIELD OF THE INVENTION

The present invention relates to a shelter structure, in particular for a load deck, such as a platform of a truck, of a trailer, or the like, and it also relates to a shelter incorporating such a structure.

More particularly, the invention relates to a shelter structure comprising:

- a plurality of parallel arches each made up of facing uprights connected together by a cross-member, said arches being suitable for supporting at least one tarpaulin type covering element and being movable along a guide path towards and away from one another between a deployed position of said structure where it forms a shelter for said surface, and a more compact, folded position of said structure where it releases at least a portion of said surface;
- connection means between the facing uprights of two adjacent arches, at least a portion of said connection means being mounted to be movable in a direction that extends transversely to the travel plane of the uprights when the structure is passing from one position to another; and
- a plurality of spreaders, each spreader being connected to an arch by a hinged connection to pass from a folded position in which it extends against said arch to a deployed position in which it forms an additional cross-member, and vice versa.

BACKGROUND OF THE INVENTION

Such a shelter structure is described in patent FR 2 891 782. Such a structure presents the advantage of making it possible to load a container or a conventional cargo from above or from one of the sides of the deck. Nevertheless, until now, such a structure does not make it possible to optimize utilization of the height of the shelter structure. When the shelter structure is in the folded position, which position may be used during periods of road travel when the load deck is supporting a container, the spreaders project in part above the arches, since each spreader is connected to an arch by a pivot connection about an axis that is substantially parallel to the longitudinal axis of the cross-member of the arch. In the deployed position, the tops of the arches and the tops of the spreaders occupy substantially the same plane in order to form a roof that is substantially plane. The portions of the spreaders that project above the arches when the shelter structure is in its folded position constitute a loss of vertical loading volume for the shelter structure. It is necessary to lower the height of the arches in order to comply with road loading gauges while the structure is in its folded position.

SUMMARY OF THE INVENTION

An object of the present invention is thus to propose a shelter structure of the above-specified type in which its design makes it possible to optimize the loading volume of said structure in the height direction without detracting from the versatility of said structure.

To this end, the invention provides a structure for sheltering a surface, in particular a load deck, such as a platform of a truck, a trailer, or the like, said structure comprising:

- a plurality of parallel arches each made up of facing uprights connected together by a cross-member, said arches being suitable for supporting at least one tarpaulin type covering element and being movable along a guide path towards and away from one another between a deployed position of said structure where it forms a shelter for said surface, and a more compact, folded position of said structure where it releases at least a portion of said surface;
- connection means between the facing uprights of two adjacent arches, at least a portion of said connection means being mounted to be movable in a direction that extends transversely to the travel plane of the uprights when the structure is passing from one position to another; and
- a plurality of spreaders, each spreader being connected to an arch by a hinged connection to pass from a folded position in which it extends against said arch to a deployed position in which it forms an additional cross-member, and vice versa;

the structure being characterized in that for at least one spreader, and preferably for each of the spreaders, the hinge connection between the spreader and the arch is at least a pivotal connection of the spreader about an axis substantially parallel to the longitudinal axis of the cross-member of said arch and at least a sliding connection of the spreader along an upright of the arch.

Because, for at least one spreader and preferably for each of the spreaders, the hinge connection between the spreader and the arch comprises not only a pivotal connection of the spreader about an axis extending transversely to the longitudinal axis of the upright of said arch, but also at least a sliding connection enabling the spreader to slide along an axis that is substantially parallel to the longitudinal axis of an upright of the arch, the tops of the spreaders and of the arches lie in substantially the same plane parallel to the loading deck regardless of the deployed or folded position of the structure, such that the loading volume of said structure in the height direction is optimized relative to road loading gauges.

Preferably, each spreader connected to an arch by a pivotal and sliding hinge connection is arranged, over at least a portion of its stroke from the deployed position towards the folded position, so as to be parallel to its pivoting movement going towards the arch to which it is connected in hinged manner, being mounted to move in sliding towards the bottom ends of the uprights of said arch.

Conversely, each spreader connected to an arch by a pivotal and sliding hinge connection is arranged, over at least a portion of its stroke from the folded position towards the deployed position, so as to be parallel to its pivoting movement going away from the arch to which it is connected in hinged manner, being mounted to move in sliding towards the top ends of the uprights of said arch.

Preferably, each spreader connected to an arch by a pivotal and sliding hinge connection is locked against sliding movement when in the deployed position.

Preferably, the spreader is in the form of an upside-down U-shape, and the hinge connection between a spreader and an arch comprises hinge connection means arranged at the end of each branch of the U-shape between a branch of the U-shape and an upright of the arch.

Preferably, the pivotal and sliding hinge connection between a spreader and an arch includes, for each upright of the arch, a slot arranged on the upright of the arch and a peg carried by the spreader and slidably movable in said slot.

Preferably, the slot is in the form of an upside-down L-shape with a "vertical" portion substantially parallel to the upright of the arch and suitable for having the peg travel therealong when the spreader passes from one position to another, and a horizontal portion suitable for being occupied by the peg in the deployed position of the spreader, and the means for locking sliding movement of said spreader are formed at least in part by two of the edges of the horizontal portion of the slot.

Preferably, each spreader that is connected to an arch via a pivotal and sliding hinge connection, is not only provided with its pivotal and sliding hinge connection, but is also coupled to each of the uprights of the arch by a respective link having its ends coupled respectively to the spreader and to the upright of the arch by a pivotal connection of axis substantially orthogonal to the longitudinal axis of the upright of the arch.

Preferably, for each spreader connected to an arch by a pivotal and sliding hinge connection, said structure includes return means for urging said spreader towards the deployed position.

Preferably, the return means comprise at least one spring arranged at one end of the link at the connection between the link and the spreader.

Preferably, the connection means between the uprights of two adjacent arches comprise, for each facing pair of uprights, a post connected to said facing uprights of said adjacent arches via links suitable for allowing the post to move to one side or the other of the travel plane of the facing uprights while folding said structure.

The invention also provides a shelter for sheltering a surface, in particular a load deck, such as a platform of a truck, a trailer, or the like, said shelter comprising a shelter structure and at least one tarpaulin type covering element that covers said shelter structure at least in part, the shelter being characterized in that said structure is of the above-specified type.

BRIEF DESCRIPTION OF THE DRAWINGS

The invention can be better understood on reading the following description of embodiments given with reference to the accompanying drawings, in which:

FIG. 8 is a fragmentary view of the shelter structure at its connection with the guide path.

DETAILED DESCRIPTION OF THE INVENTION

Figure 1:
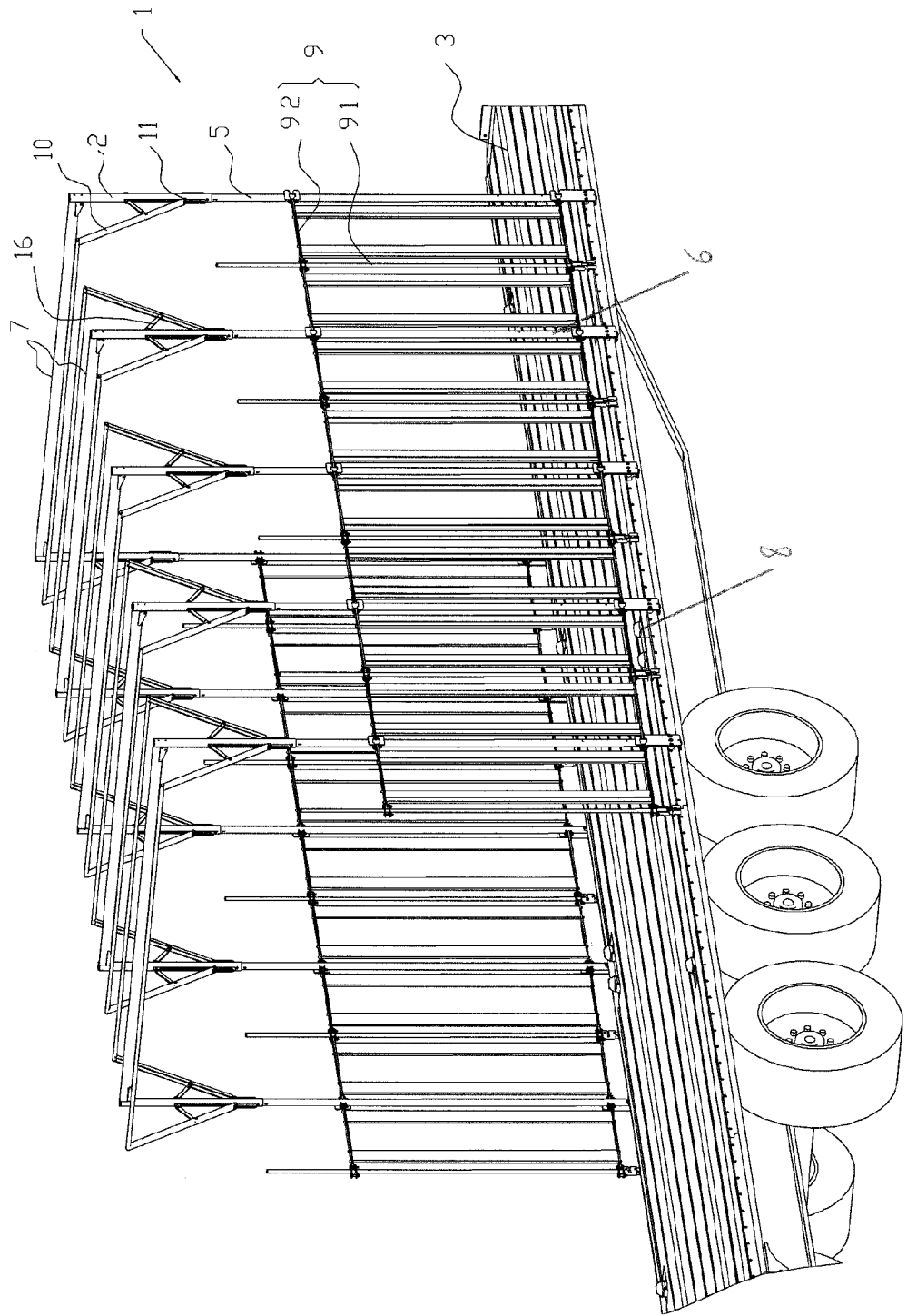
FIG. 1 is an overall perspective view of a shelter structure in accordance with the invention.
Figure 2:
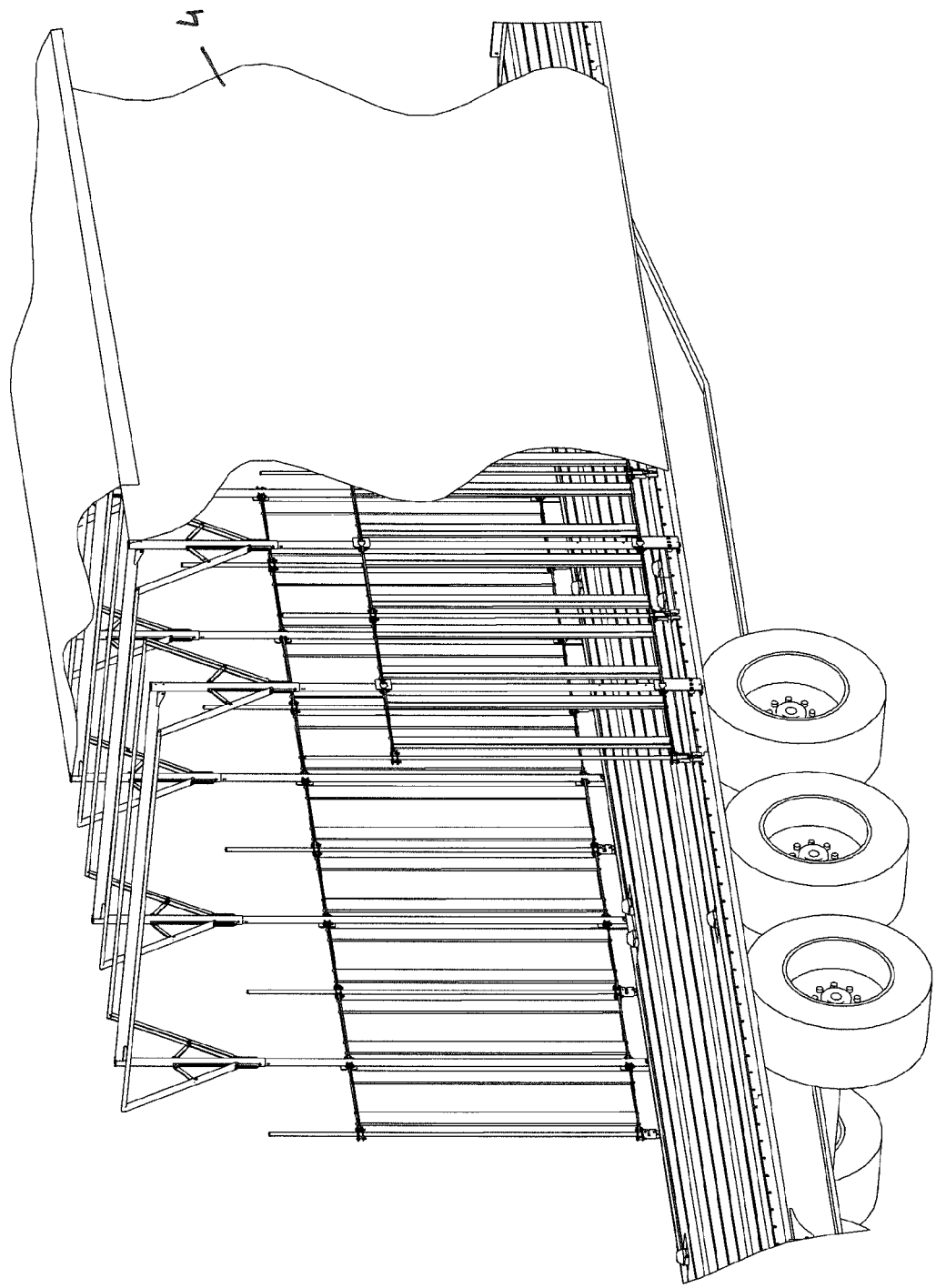
FIG. 2 is a fragmentary overall perspective view of a shelter in accordance with the invention.
Figure 3:
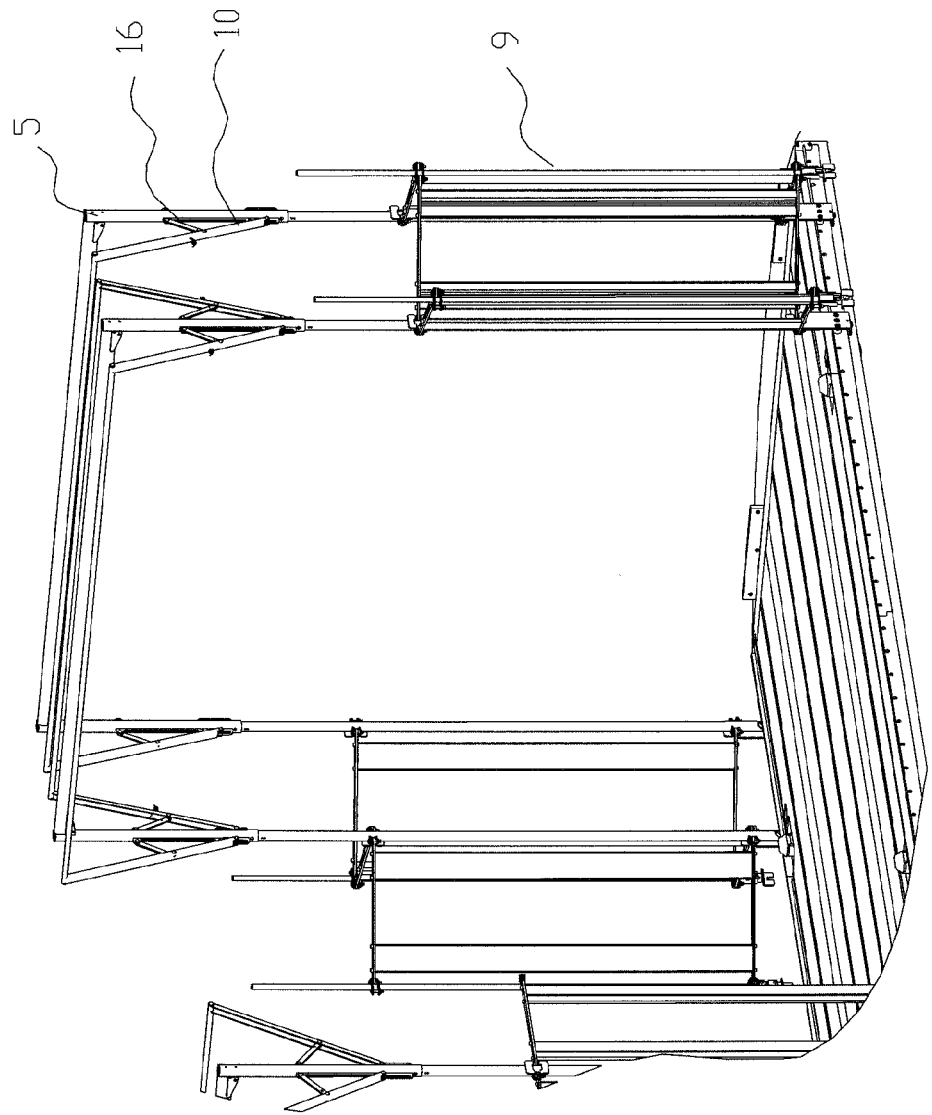
FIG. 3 is a fragmentary perspective view of a shelter structure while the structure is being folded.
Figure 4:
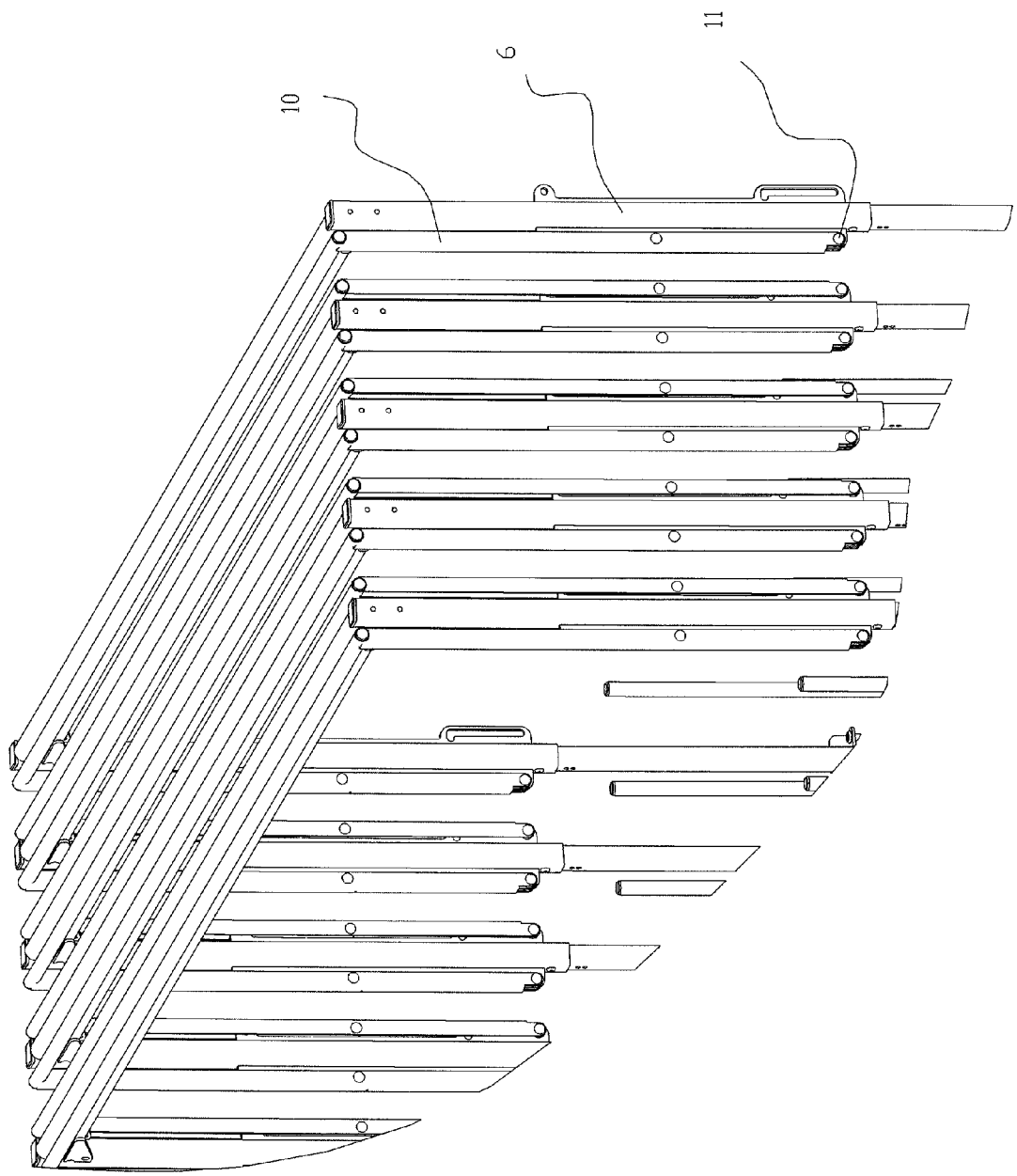
FIG. 4 is a fragmentary perspective view of a shelter structure with said shelter structure in its folded position.
Figure 5:
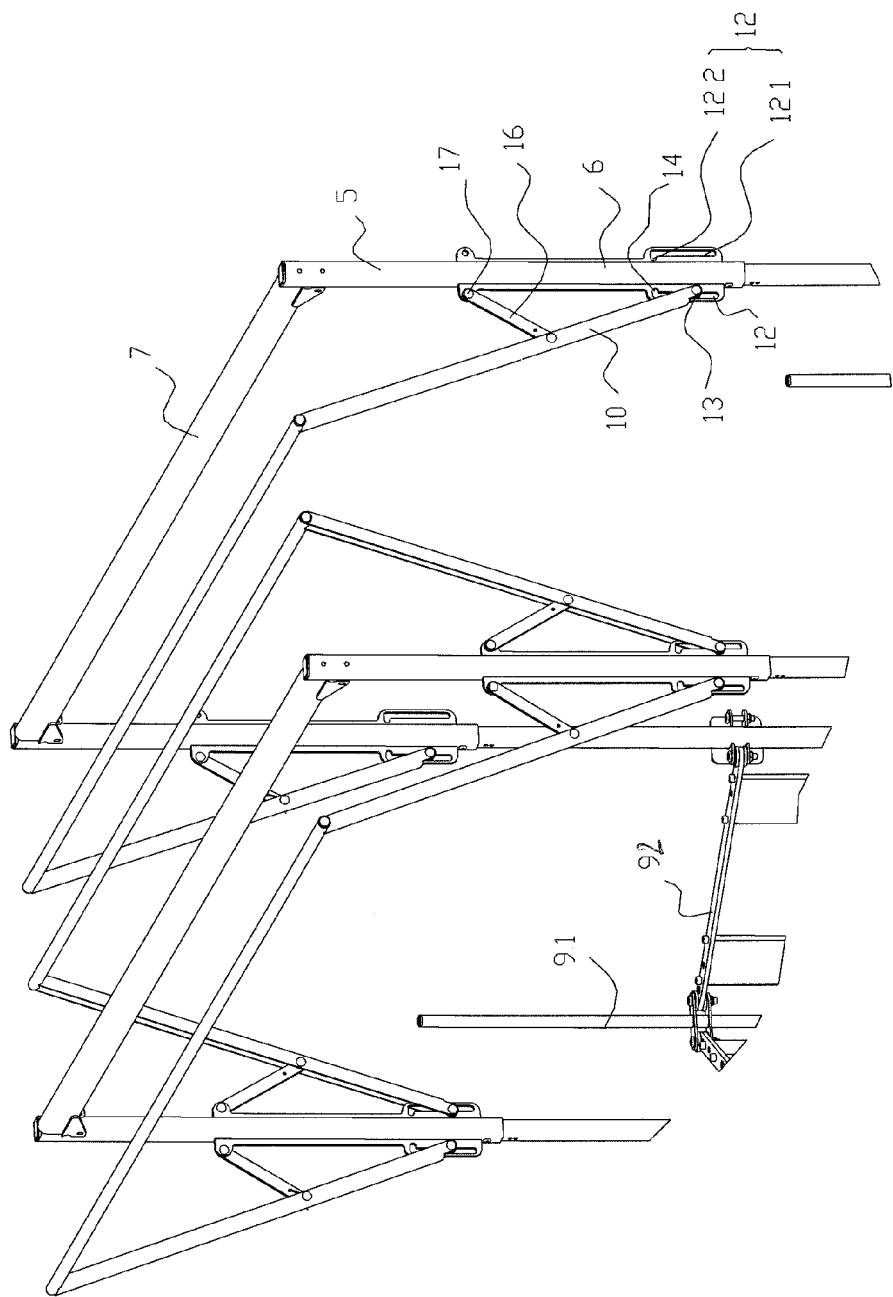
FIG. 5 is a fragmentary perspective view of a shelter structure while passing from the folded position to the deployed position of said shelter structure.
Figure 6:
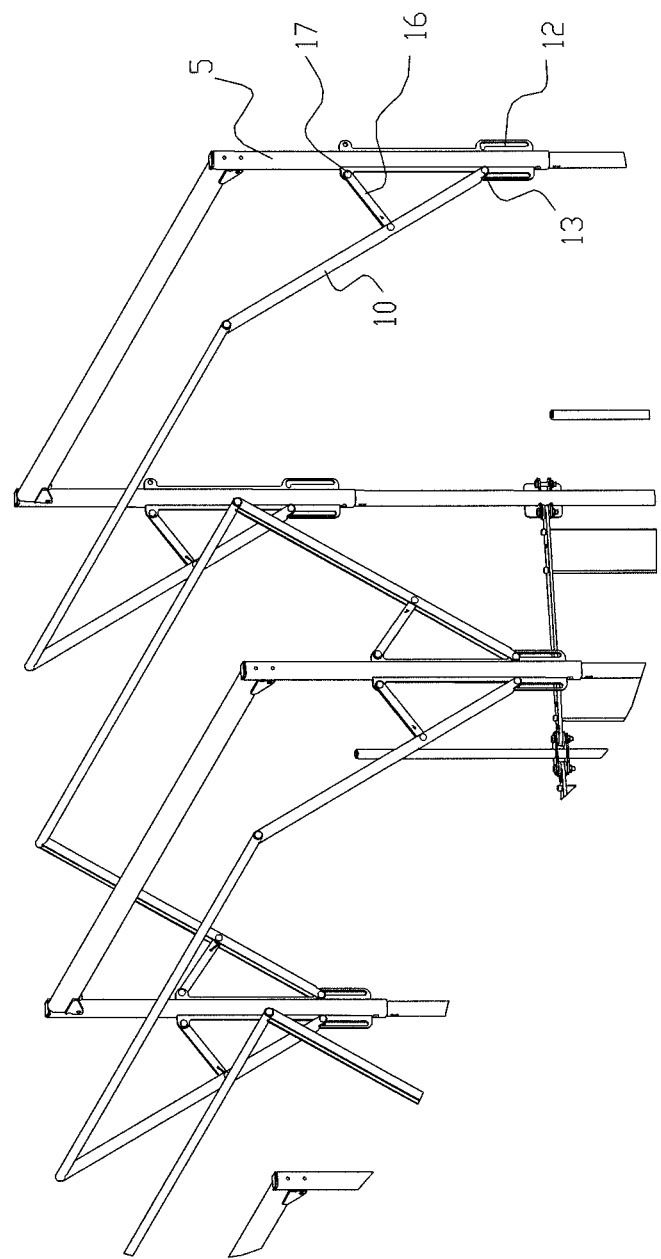
FIG. 6 is a fragmentary perspective view of a shelter structure in the deployed position of said shelter structure.
Figure 7:
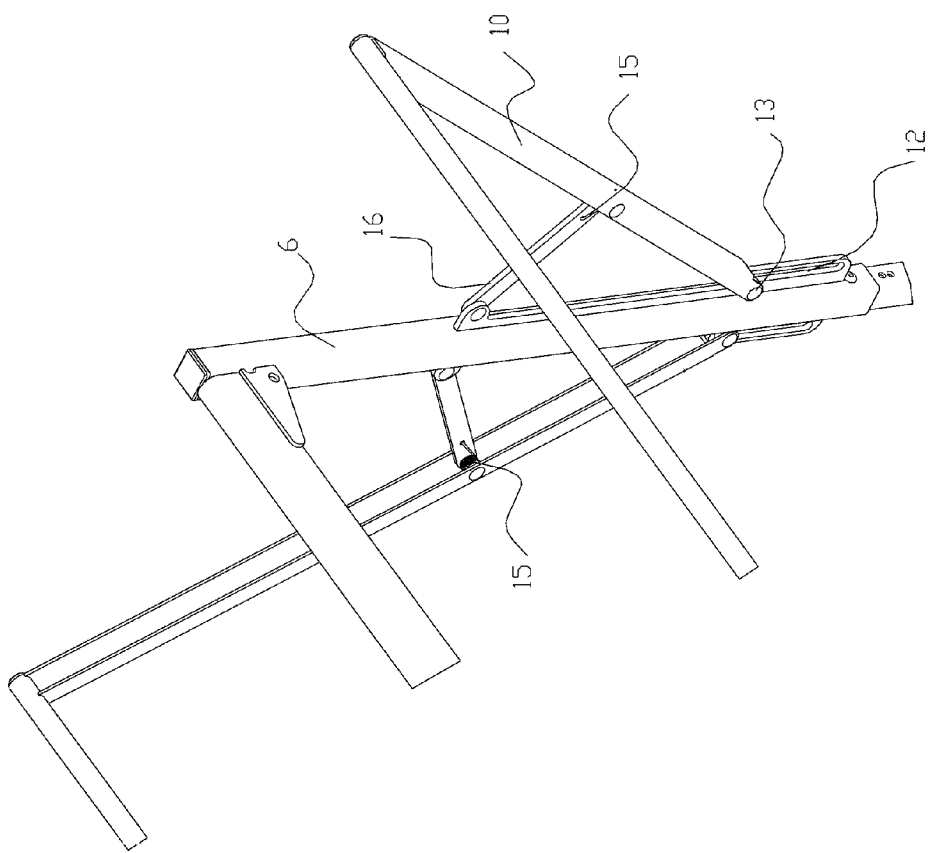
FIG. 7 is a fragmentary perspective view of two spreaders connected to an arch.

As mentioned above, the shelter structure 2 of the invention is in the form of an articulated framework suitable for being covered by at least one tarpaulin type flexible covering element 4 in order to form a shelter 1 for a horizontal surface 3 such as the platform of a truck, as shown in FIG. 1. This structure 2 is thus secured to the load deck of the truck in order to form an enclosure for protecting the load present on said deck. The structure comprises a plurality of arches 5 suitable for supporting said at least one tarpaulin type covering element 4. Each of these parallel arches 5 comprises facing uprights 6 connected together by a cross-member 7. The arches are movable along a guide path 8 towards or away from one another between a deployed position of the structure 2 in the form of a shelter for said surface 3 and a folded position in which said structure 2 is more compact, thereby releasing at least a portion of said surface 3.

In the example shown in FIG. 1, five arches are shown. The guide path 8 along which the uprights of the arches slide is provided on the load deck 3 and is formed by the two longitudinal edges of said deck. Each longitudinal edge is constituted by a rail that is open towards the outside of the deck and in which the arch uprights can slide by means of wheels fitted to their bottom ends.

These wheels are carried by a plate that together with the wheels forms a carriage for supporting the arch uprights 6. The load deck 3 thus has two series of uprights 6 fitted with carriages, each series of uprights moving along a rail arranged along a longitudinal edge of the deck 3.

The shelter structure 2 also has connection means 9 between the facing uprights 6 of two adjacent arches 5. At least a portion of said connection means 9 is mounted to be movable in a direction that is transverse relative to the travel plane of the uprights 6 when the structure 2 is passing from one position to another.

For each pair of facing uprights 6, the connection means 9 between the uprights 6 of two adjacent arches 5 comprise a post 91 connected to said facing uprights 6 of said adjacent arches 5 via links 92 that are suitable for allowing the post 91 to move to one side or to the other of the travel plane of the facing uprights 6, when folding said structure 2.

Said links 92 enable the framework of the structure 2 to be articulated in such a manner as to be capable of being folded. Since the posts 91 are not slidably mounted in the guide path, they can move laterally relative to the deck 3, thus enabling the shelter structure 2 to pass into a folded position. In the folded position of said structure 2, the posts 91 are pushed inwards or outwards relative to the deck, so that the structure 2 adopts a concertina bellows configuration.

FIG. 8 shows the detail of the connection between arch uprights 6 and posts 91. As mentioned above, two arch uprights 6 are each connected by two links 92 to a post 91 parallel to the arch uprights 6. An upright 6, a post 91, and the links thus form an articulated frame. The links 92 of a frame may be connected together by panel elements in order to reinforce the mechanical strength of the structure. Each post 91 is fitted at each of its ends with a connection piece for connecting the post 91 to the links 92. The links 92 are hinged to said connection piece about an axis parallel to the axis of the post. In the same manner, each other end of a link is hinged to the carriage carrying the arch uprights 6 or to a part that is carried by said uprights. Once more, this hinging takes place about a pivot axis parallel to the axis of the uprights.

As mentioned above, when the structure is in the folded position, the posts 91 may move inwards or outwards relative to the perimeter defined by the arch uprights 6. It is advantageous for one folding direction for the posts 91 to be privileged compared with the other. Thus, in the vicinity of at least one end of each post, an abutment may be provided that is movable between two positions, a locking position preventing the post 91 from moving in one direction perpendicular to the travel plane of the uprights 6, and another position allowing the post 91 to move in said direction. While the structure is being folded, the abutment serves to define a preferred folding direction in which the operations to be performed take place quickly. In order to fold said shelter structure, it suffices to exert thrust on one end of said structure 2. This thrust causes the two series of uprights 6 to slide along their respective guide rails, thereby moving the uprights of each series towards one another and actuating the hinges of the links 92. Actuating the links 92 causes the posts 91 to move perpendicularly to the longitudinal axis of the deck in order to give the structure a concertina bellows configuration. For the operator providing the thrust, the presence of the abutments ensures that the posts will all fold in the same direction.

In a preferred embodiment, the locking position of the abutments corresponds to a position in which the abutment prevents the post from moving towards the inside of the perimeter defined by the uprights. Thus, the preferred direction for folding the posts corresponds to folding them towards the outside of the deck. The operator applying thrust thus leads to the posts being folded towards the outside of the deck, thereby folding the shelter structure so that it completely releases the surface of the deck. This mode of folding corresponds to the conventional load transport position. The deck needs to be disengaged in order to enable a cargo to be loaded from above or from the side, and said cargo must not impede deployment of the shelter structure once loading has been performed. Once the posts 91 have been folded outwards, they do not project towards the inside of the deck 3, even during the unfolding operation.

In the unlocked position, the abutment allows the posts 91 to fold equally well in either direction, i.e. towards the inside or towards the outside of the perimeter defined by the deck. The abutment is generally in the form of a pivotally or slidably mounted part extending outside the perimeter of the surface to be covered in the vicinity of the guide path in the deployed position of the shelter structure, said abutment being suitable for pivoting about an axis parallel to the guide path or for sliding along an axis perpendicular to the guide path so as to pass from an active position to an inactive position.

The active position corresponds to the locking position in which it is possible to fold the posts only towards the outside. In the inactive position it is possible to envisage folding them in either direction.

The shelter structure 2 also has a plurality of spreaders 10. Each spreader 10 is connected to an arch 5 by a hinged connection 11 so as to pass from a folded position in which it extends pressed against said arch 5 to a deployed position in which it forms an additional cross-member, and vice versa.

In a manner characteristic of the invention, the hinge connection 11 between the spreader 10 and the arch 5 for at least one of the spreaders, and specifically for each of the spreaders 10 in this example, is a pivotal connection of the spreader 10 about an axis that is substantially parallel to the longitudinal axis of the cross-member 7 of said arch 5, and a sliding connection of the spreader 10 along an axis substantially parallel to the longitudinal axis of an upright 6 of the arch 5.

In the examples shown, each spreader 10 is in the form of an upside-down U-shape and the hinged connection 11 between a spreader 10 and an arch 5 comprises hinged connection means arranged on each branch of the U-shape between the end of the branch of the U-shape and one of the uprights 6 of the arch 5.

On each upright of the arch 5, the pivotal and sliding hinged connection 11 between a spreader 10 and an arch 5 comprises an oblong slot 12 formed in the upright 6 of the arch 5 and a peg 13 carried by the spreader 10 and slidably movable in said slot 12.

The slot 12 is in the form of an upside-down L-shape with a "vertical" portion 121 that is substantially parallel to the upright 6 of the arch 5 and suitable for having the peg 13 travel therealong when the spreader 10 passes from one position to another, and a horizontal portion 122 suitable for being occupied by the peg 13 in the deployed position of the spreader 10. The means 14 for locking sliding movement of said spreader 10 are formed at least in part by two of the edges of the horizontal portion 122 of the slot 12.

Thus, each spreader 10 connected to an arch 5 via a pivotal and sliding hinge connection 11 is locked against sliding movement in the deployed position. Each spreader 10 connected to an arch 5 by a pivotal and sliding hinge connection 11 has not only its pivot and sliding hinge connection 11, but is also coupled to each of the uprights 6 of the arch 5 by respective links 16, each having one end coupled to the spreader 10 and an opposite end coupled to the upright 6 of the arch 5 via respective pivot connections 17 of axis orthogonal to the longitudinal axis of the upright 6 of the arch 5 and substantially parallel to the longitudinal axis of the cross-member of said arch 5. For each spreader 10 connected to an arch 5 by a pivotal and sliding hinge connection 11, said structure 2 has return means 15 urging said spreader 10 towards a deployed position. In this embodiment, the return means 15 comprise a spring arranged at that end of each link 16 where the link 16 is connected to the spreader 10. Each spreader 10 that is connected to an arch 5 via a pivotal and sliding hinge connection 11 is arranged, over at least a portion of its stroke from the deployed position to the folded position, so as to be parallel to its pivoting movement towards the arch 5 to which it is connected in hinged manner, and is mounted to slide towards the bottom ends of the uprights 6 of said arch 5. Conversely, each spreader 10 connected to an arch 5 by a pivotal and sliding hinge connection 11 is arranged, over at least a portion of its stroke from the folded position towards the deployed position, so as to be parallel to its pivoting movement away from the arch 5 to which it is connected in hinged manner, and is mounted to move in sliding towards the top ends of the uprights 6 of said arch 5.

In this deployed position, the pegs of the spreader take up positions in the horizontal portions of the slots of the uprights, so that in this position, any sliding movement of the spreader along said uprights is prevented.

The shelter structure 2 is generally covered by at least one covering element 4. In an advantageous embodiment, the shelter structure 2 supports two tarpaulin type flexible covering elements 4, one of said flexible covering elements 4 covering the side faces of the shelter structure, and the other covering the roof of the shelter structure. The side flexible covering element is preferably made in two portions, each covering a respective one of the side faces of the loading volume. This design makes it easy to position the roof flexible element independently of the side flexible covering elements. Said flexible covering elements are secured to the framework of the shelter structure 1 by means incorporated in the flexible covering elements. Each spreader 10 is housed at least in part in a sheath in the tarpaulin type flexible covering element that covers the roof of the shelter structure in order to guarantee that it is guided. Sheaths are thus provided in the roof covering element in order to receive the spreaders 10. These sheaths (not shown) are preferably obtained by stitching respective patches onto the inside face of the tarpaulin. Such a patch co-operates with the tarpaulin to define a through duct. Such a patch is fitted with Velcro (registered trademark) type self-gripping means so as to be capable of passing from an open position in which it is possible to insert a cross-member of the spreader inside the sheath, to a closed position where the roof tarpaulin and the spreader are secured to each other. Substantially identical sheaths may also be arranged on the side flexible covering element so as to secure it with the posts. Under such circumstances, each post is inserted in a sheath provided on the side covering element.

The operations needed for folding the shelter structure towards the inside of the perimeter defined by the deck 3 are described below. Since folding the posts 91 towards the outside is preferred, it is necessary to unlock the abutments in order to be able to perform folding in the other direction. The abutments are generally not directly accessible from outside the deck 3. They are covered by the side flexible covering element. Thus, the side flexible covering element of the tarpaulin type supported by the shelter structure is foldable outwards at its base in order to form a flap that is held pressed against the outside face of the tarpaulin by appropriate holder means so as to facilitate access to the locking abutment. In order to uncover the abutments, the tarpaulin is thus raised at the level of the guide path like a hem. A system of straps arranged along the length of said flexible structure enables the tarpaulin to be held in position while the operator proceeds with unlocking the abutments.

In order to fold the structure while positioning the posts 91 towards the inside, the rear door of the deck is opened initially and the frame of said rear door is separated from the deck. In the transport position, the rear door frame is naturally held in place relative to the deck so as to avoid any unwanted sliding and folding of the shelter structure. Thereafter, the side tarpaulin is raised by using the straps and the abutments are unlocked so as to allow the posts to move towards the inside of the deck. Preferably, the abutment fitted to the posts 91 situated closest to the rear of the deck is not unlocked. This provides a rigid structure for making it easier to push against the shelter structure. Thereafter, each post 91 and the corresponding hinge is directed a little towards the inside of the deck. As a result, merely applying thrust will cause the posts to fold in the desired direction. Thrust is then applied to the rear frame of the shelter structure 1 so as to cause the uprights 6 of the arches to slide and so as to cause said structure to fold into a concertina bellows shape. During this movement, the spreaders move pivotally towards the arch uprights and in sliding towards the bottom ends of said uprights. Once the shelter structure has been folded, the last abutment is unlocked in order to fold the last posts. The position with the posts 91 folded towards the inside corresponds to the position for transporting a container. With the deck released, it is possible to load on such a container, e.g. by means of a crane. Furthermore, since the posts 91 do not project outside the area defined by the deck 3, road transport of the container is authorized.

The structure is deployed merely by slidably moving the arch uprights in the opposite direction along the guide path. Since the tops of the spreaders in the deployed position are at the same level as the tops of the spreaders in the folded position, the vertical loading volume of the shelter structure is optimized.

The invention claimed is:

1. A structure (2) for sheltering a surface (3), said structure (2) comprising:
    a plurality of parallel arches (5) each made up of facing uprights (6) connected together by a cross-member (7), said arches (5) being suitable for supporting at least one tarpaulin type covering element (4) and being movable along a guide path (8) towards and away from one another between i) a deployed position for forming a shelter for said surface (3), and ii) a more compact folded position for releasing at least a portion of said surface (3);
    connection means (9) between the facing uprights (6) of two adjacent arches (5), at least a portion of said connection means (9) being mounted to be movable in a direction that extends transversely to the travel plane of the uprights (6) when the structure (2) is passing between the folded position and the deployed position; and
    a plurality of spreaders (10), each spreader (10) being connected to an arch (5) by a hinged connection (11) to pass from the folded position, in which the spreader extends against said arch (5), to the deployed position, in which the spreader forms an additional cross-member, and vice versa,
    wherein for at least one spreader (10), the hinge connection (11) between the spreader (10) and the arch (5) is at least a pivotal connection of the spreader (10) about an axis substantially parallel to the longitudinal axis of the cross-member (7) of said arch (5) and a sliding connection of the spreader (10) along an upright (6) of the arch (5).

2. The structure (2) according to claim 1, wherein each spreader (10) connected to an arch (5) by a pivotal and sliding hinge connection (11) is arranged, over at least a portion of a stroke of said spreader from the deployed position towards the folded position, so as to be parallel to a pivoting movement going towards the arch (5) to which the spreader is connected in hinged manner, being mounted to move in sliding towards the bottom ends of the uprights (6) of said arch (5).

3. The structure (2) according to claim 1, wherein each spreader (10) connected to an arch (5) by a pivotal and sliding hinge connection (11) is locked against sliding movement when in the deployed position.

4. The structure (2) according to claim 1,
    wherein the spreader (10) is in the form of an upside-down U-shape, and
    wherein the hinge connection (11) between a spreader (10) and an arch (5) comprises hinge connection means arranged at the end of each branch of the U-shape between a branch of the U-shape and an upright (16) of the arch (5).

5. The structure (2) according to claim 3, wherein the pivotal and sliding hinge connection (11) between a spreader (10) and an arch (5) includes, for each upright (6) of the arch (5), a slot (12) arranged on the upright (6) of the arch (5) and a peg (13) carried by the spreader (10) and slidably movable in said slot (12).

6. The structure (2) according to claim 5, the structure being
    wherein the slot (12) is in the form of an upside-down L-shape,
        a vertical portion (121) of the L-shape being substantially parallel to the upright (6) of the arch (5), and being suitable for having the peg (13) travel thereralong when the spreader (10) passes between the folded position and the deployed position, and
        a horizontal portion (122) of the L-shape being suitable for being occupied by the peg (13) in the deployed position, and
    wherein the means (14) for locking sliding movement of said spreader (10) are formed at least in part by two of the edges of the horizontal portion (122) of the slot (12).

7. The structure (2) according to claim 1, wherein each spreader (10) that is connected to an arch (5) via a pivotal and sliding hinge connection (11), is also coupled to each of the uprights (6) of the arch (5) by a respective link (16) with ends coupled respectively to the spreader (10) and to the upright (6) of the arch (5) by a pivotal connection (17) of axis substantially orthogonal to the longitudinal axis of the upright (6) of the arch (5).

8. The structure (2) according to claim 7, wherein, for each spreader (10) connected to an arch (5) by a pivotal and sliding hinge connection (11), said structure (2) includes return means (15) for urging said spreader (10) towards the deployed position.

9. The structure (2) according to claim 8, wherein the return means (15) comprise at least one spring arranged at one end of the link (16) at the connection between the link (16) and the spreader (10).

10. The structure (2) according to claim 1, wherein the connection means (9) between the uprights (6) of two adjacent arches (5) comprise, for each facing pair of uprights (6), a post (91) connected to said facing uprights (6) of said adjacent arches (5) via links (92) suitable for allowing the post (91) to move to one side or the other of the travel plane of the facing uprights (6) while folding said structure (2).

11. A shelter (1) for sheltering a surface (3), said shelter (1) comprising a shelter structure (2) in accordance with claim 1 and at least one tarpaulin type covering element (4) that covers said shelter structure (2) at least in part.

12. The structure (2) according to claim 1, wherein the pivotal and sliding hinge connection (11) between a spreader (10) and an arch (5) includes, for each upright (6) of the arch (5), a slot (12) arranged on the upright (6) of the arch (5) and a peg (13) carried by the spreader (10) and slidably movable in said slot (12).

13. The structure (2) according to claim 1, wherein, for each spreader (10) connected to an arch (5) by a pivotal and sliding hinge connection (11), said structure (2) includes return means (15) for urging said spreader (10) towards the deployed position.

* * * * *